United States Patent [19]

Ament et al.

[11] Patent Number: 5,687,828
[45] Date of Patent: Nov. 18, 1997

[54] FRICTION CLUTCH FOR A DRIVE TRAIN OF A MOTOR VEHICLE AND A TORSIONAL DAMPER FOR A FRICTION CLUTCH

[75] Inventors: Norbert Ament, Eltingshausen; Harald Raab, Schweinfurt, both of Germany

[73] Assignee: Fichtel & Sachs AG, Schweinfurt, Germany

[21] Appl. No.: 346,790

[22] Filed: Nov. 30, 1994

[30] Foreign Application Priority Data

Dec. 1, 1993 [DE] Germany .................. 43 40 866.4

[51] Int. Cl.⁶ ............................................. F16D 13/64
[52] U.S. Cl. ............................ 192/213.2; 192/213.1; 192/70.17
[58] Field of Search .................... 92/70.17, 200, 92/212, 214.1, 213, 213.1, 213.2

[56] References Cited

U.S. PATENT DOCUMENTS

| | | | |
|---|---|---|---|
| 4,651,857 | 3/1987 | Schraut et al. | |
| 4,875,562 | 10/1989 | Fujimoto | 192/212 X |
| 5,000,304 | 3/1991 | Kock et al. | 192/70.17 X |
| 5,163,875 | 11/1992 | Takeuchi | 464/68 X |

FOREIGN PATENT DOCUMENTS

| | | |
|---|---|---|
| 0087524 | 9/1983 | European Pat. Off. . |
| 2657306 | 6/1977 | Germany . |
| 4031762 | 4/1992 | Germany . |
| 1121060 | 7/1968 | United Kingdom . |
| 2093950 | 9/1982 | United Kingdom . |
| 8100141 | 1/1981 | WIPO . |
| 8907720 | 8/1989 | WIPO . |

Primary Examiner—Rodney H. Bonck
Assistant Examiner—Saul J. Rodriguez
Attorney, Agent, or Firm—Nils H. Ljungman and Associates

[57] ABSTRACT

A friction clutch for a drive train of a motor vehicle generally has a torsional damper with at least one hub and hub disc concentric to an axis of rotation, and cover plates located on both sides of the hub disc which are non-rotationally connected together and held at a distance from one another. Coil springs can be located in apertures of the hub disc, on one hand, and in the cover plates on the other hand. The apertures can be designed so that the coil springs, located in the apertures of the cover plates, in spite of the fact that the coil springs are held without stress on their ends, cannot come loose from the apertures. To achieve this, the edges with which the ends of the respective coil springs come in contact can be provided with indentations which are designed for the radial release of the respective outermost windings of the coil springs.

20 Claims, 3 Drawing Sheets

FRICTION CLUTCH FOR A DRIVE TRAIN OF A MOTOR VEHICLE AND A TORSIONAL DAMPER FOR A FRICTION CLUTCH

BACKGROUND OF THE INVENTION

1. Field of the Invention

The present invention generally relates to a friction clutch for a drive train of a motor vehicle, and in essence can also relate to a two-mass flywheel for a drive train. More particularly, the present invention relates to a torsional damper for a friction clutch or two-mass flywheel. Such a torsional damper can typically have at least one hub, concentric with an axis of rotation, and including a hub disc with cover plates located on both sides of the hub disc. The cover plates can preferably be non-rotationally connected and held at a distance from one another. Coil springs can be located, on one hand, in apertures in the hub disc, and, on the other hand, in apertures in the cover plates. The outermost windings of the coil springs essentially each come into contact with a corresponding edge of the apertures formed in the cover plates.

2. Background Information

In known torsional dampers, it is typically customary, both on no-load spring devices and on load spring devices, to provide certain apertures to hold respective coil springs in the cover plates located on both sides of the hub. In the peripheral area of these apertures, along their respective edges facing the coil springs, slight depressions are typically formed to provide support on both ends for the springs, which springs also project through an aperture formed in the hub disc. The known dampers include two different designs for the mounting of the coil springs on their ends:

In a first design, the final windings of a coil spring are typically recessed with respect to the other windings, i.e. they have a reduced diameter and/or they have a bevel, or chamfer. Consequently, the final windings of the coil spring are inserted with some clearance into the corresponding apertures of the cover plates, and are able to execute a relative movement with respect to the edges corresponding to these windings. The coil springs then come into stress-free contact with the corresponding edges of the apertures, but on account of the smaller diameter of the outermost windings, there is a danger that during operation of the clutch plate, the coil springs will slip out of their guides and become jammed in a diagonal position between the two cover plates and the hub disc. Such slipped springs can cause operational problems, for example, by changing the tension generated by the coil spring, as well as wear and strength problems if the spring is jammed in the diagonal position. This design is also relatively expensive, on account of the additional machining steps required for the retraction and/or beveling of the windings.

Alternatively, the coil springs can be left so that the final windings have the same diameter as the other windings. As such, the ends of the spring can essentially be prevented from slipping out of the apertures, but the final windings can then sometimes become jammed in the areas where they come into contact with the aperture, which jamming can cause stresses in the coil spring, and which stresses can possibly result in the breaking of the spring.

OBJECT OF THE INVENTION

The object of the present invention is therefore to design the apertures in the cover plates of a torsional damper so that the coil springs, which are in contact at their edges with the apertures, cannot come loose from the apertures, in spite of the fact that their ends are held without stress.

SUMMARY OF THE INVENTION

The present invention teaches that this object can be achieved by means of a torsional damper wherein the edges of the apertures, with which edges the outermost windings of the respective coil springs come in contact, are preferably formed with indentations which hold the outermost windings in a radially free position with respect to the cover plates.

On account of the indentations in the apertures, on their edges facing the ends of the respective coil springs, there are preferably pockets which permit the outermost windings of the coil springs to be positioned freely in the radial direction, so that the outermost windings have sufficient free space for movements relative to the corresponding edge. Such movements can even be possible when the coil springs are designed so that the outermost windings have the same diameter as the other windings. This possibility of a frictionless relative motion between the ends of the springs and the corresponding edges of the aperture is preferably so that no stresses can build up on the ends of the springs, thereby minimizing the possibility of breakage of the springs.

Since the indentations can essentially make possible a radial release of the ends of the springs, during the assembly operation of the clutch disc, or more particularly, during manufacture and processing of the coil springs, additional machining operations, such as the recessing or beveling of the final windings on the coil springs, are essentially no longer necessary.

In one preferred embodiment of the present invention, the indentations in the peripheral edges of the apertures can preferably be made by simply forming a depression in the existing metal surrounding the apertures. In at least one embodiment of the present invention, this can at least be done by simply deforming the metal of the edge, such as by striking with a deforming tool to bend the edge outwardly. By the simple formation of a depression, the indentations can be manufactured with essentially the lowest possible effort and expense. In an alternative method of forming the indentations, recesses could be formed adjacent the peripheral edges, such as by removing some of the existing metal surrounding the apertures. In one alternative embodiment of the present invention, the recesses could preferably be formed by the came punch which is used to punch out the apertures, thereby simultaneously forming the indentations.

In essence, each of the above methods has its advantages. For instance, indentations manufactured by forming depressions can give the respective cover plate a greater stability in the vicinity of the apertures than is the case with indentations formed by recesses. On the other hand, forming the indentations by providing recesses enables the indentations to be formed at the same time as the formation of the apertures in the cover plates, thereby reducing the number of steps, and the manufacturing expense, in comparison to the formation by depression wherein the depression step is carried out after the formation of the apertures.

Because of the indentations in accordance with the present invention, the springs, once cut and shaped with a flat end, essentially no longer need to be bevelled about the circumference of the end coils.

A further discussion of the above embodiments of the present invention will be provided herebelow with reference to the drawings. It should be understood that when the word "invention" is used in this application, the word "invention"

includes "inventions", that is, the plural of "inventions". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a friction clutch for a drive train of a motor vehicle: the friction clutch comprising: a rotary power input member; a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction for engaging the clutch disc with the rotary power input apparatus; biasing apparatus for biasing the pressure plate apparatus in the axial direction to apply the axial force to the clutch disc; the clutch disc comprising: hub apparatus, the hub apparatus comprising: a hub portion for engaging shaft apparatus of a transmission; and a hub disc disposed about the hub portion and extending radially from the hub portion, the hub disc having a first side and a second side; at least one cover plate disposed adjacent the hub disc, the at least one cover plate being rotationally mounted on the hub portion for relative rotational movement with respect to the hub disc; and damping apparatus for damping relative rotational movement between the hub disc and the at least one cover plate; the at least one cover plate comprising at least one opening therethrough at a position radially outward of the hub portion, the opening comprising a first edge portion and a second edge portion, the first and second edge portions being spaced apart from one another in a circumferential direction about the axis of rotation; the damping apparatus being disposed in the at least one opening, the damping apparatus having a first end disposed adjacent the first edge portion of the at least one opening and a second end disposed adjacent the second edge portion of the at least one opening; and the at least one cover plate comprising a portion for permitting radial movement of the first and second ends of the damping apparatus within the at least one opening, the radial movement being in a direction substantially radial to the axis of rotation.

Another aspect of the invention resides broadly in a method for producing a clutch disc for a friction clutch, the clutch disc defining an axis of rotation and an axial direction parallel to the axis of rotation; the clutch disc comprising: hub apparatus, the hub apparatus comprising: a hub portion for engaging shaft apparatus of a transmission; and a hub disc disposed about the hub portion and extending radially from the hub portion; at least one cover plate disposed adjacent the hub disc, the at least one cover plate being rotationally mounted on the hub portion for relative rotational movement with respect to the hub disc; and damping apparatus for damping relative rotational movement between the hub disc and the at least one cover plate; the at least one cover plate comprising at least one opening therethrough at a position radially outward of the hub portion, the opening comprising a first edge portion and a second edge portion, the first and second edge portions being spaced apart from one another in a circumferential direction about the axis of rotation; the damping apparatus being disposed in the at least one opening, the damping apparatus having a first end disposed adjacent the first edge portion of the at least one opening and a second end disposed adjacent the second edge portion of the at least one opening; and the at least one cover plate comprising a portion for permitting radial movement of the first and second ends of the damping apparatus within the at least one opening, the radial movement being in a direction substantially radial to the axis of rotation; and the method comprises the steps of: providing the hub disc and the hub portion; disposing the hub disc on the hub portion to form the hub apparatus; forming the at least one cover plate, the forming of the at least one cover plate comprising: forming the at Least one opening in the at least one cover plate; and providing the portion for permitting radial movement of the damping apparatus within the at least one opening; providing the damping apparatus in the at least one opening of the cover plate; and disposing the at least one cover plate on the hub apparatus adjacent the hub disc.

A still further aspect of the invention resides broadly in a torsional damper for a motor vehicle friction clutch, the torsional damper comprising: at least one hub concentric with an axis of rotation; a hub disc disposed about the hub; cover plates located on both sides of the hub disc, the cover plates being non-rotationally connected together and held at a distance from one another, the hub disc and cover plates comprise correspondingly aligned apertures therein; coil springs located within the aligned apertures, the coil springs having first and second ends with an outermost spring winding adjacent each end, the outermost windings coming into contact with a corresponding edge of the apertures formed in the cover plates, wherein those corresponding edges with which the outermost windings of the respective springs come in contact, comprise indentations which hold the outermost windings in a radially free position.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENTS

Figure 1:
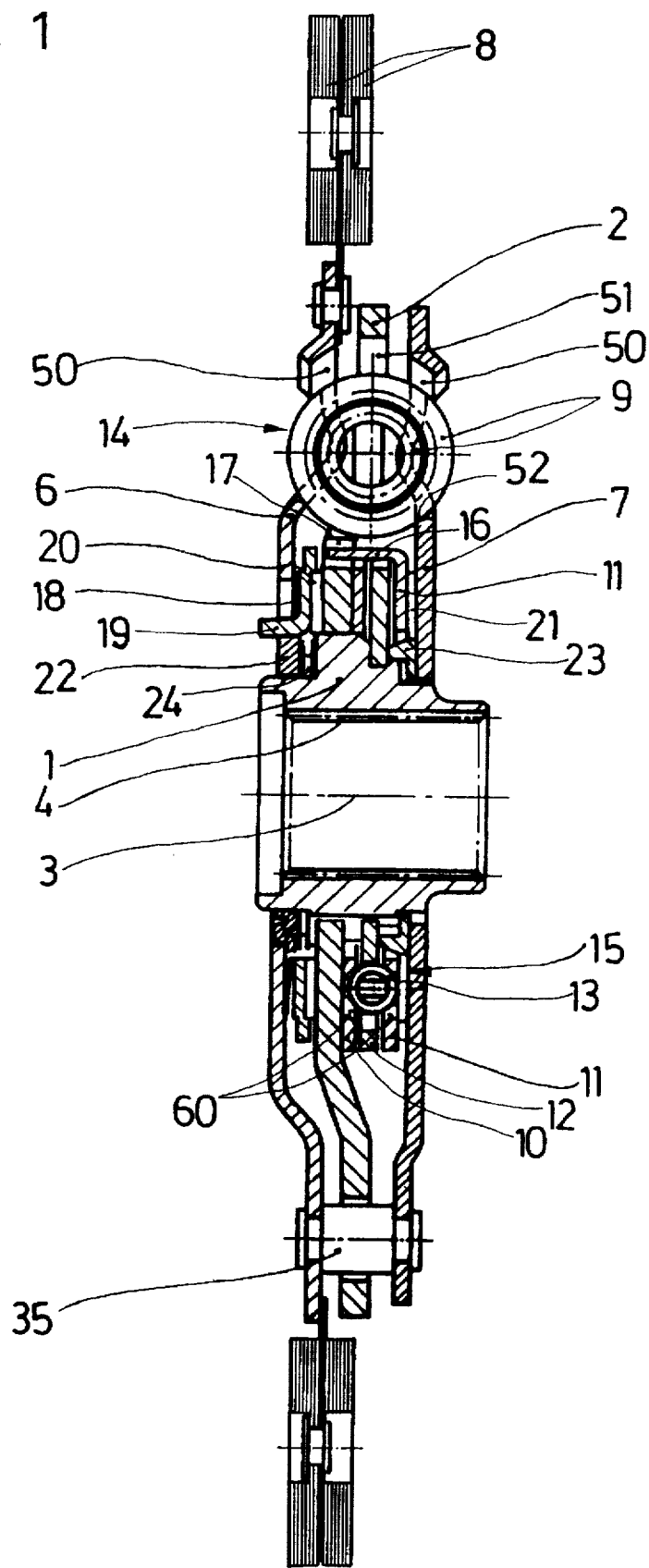
FIG. 1 shows an overall longitudinal section through a torsional damper of a clutch plate of a friction clutch.
Figure 2:
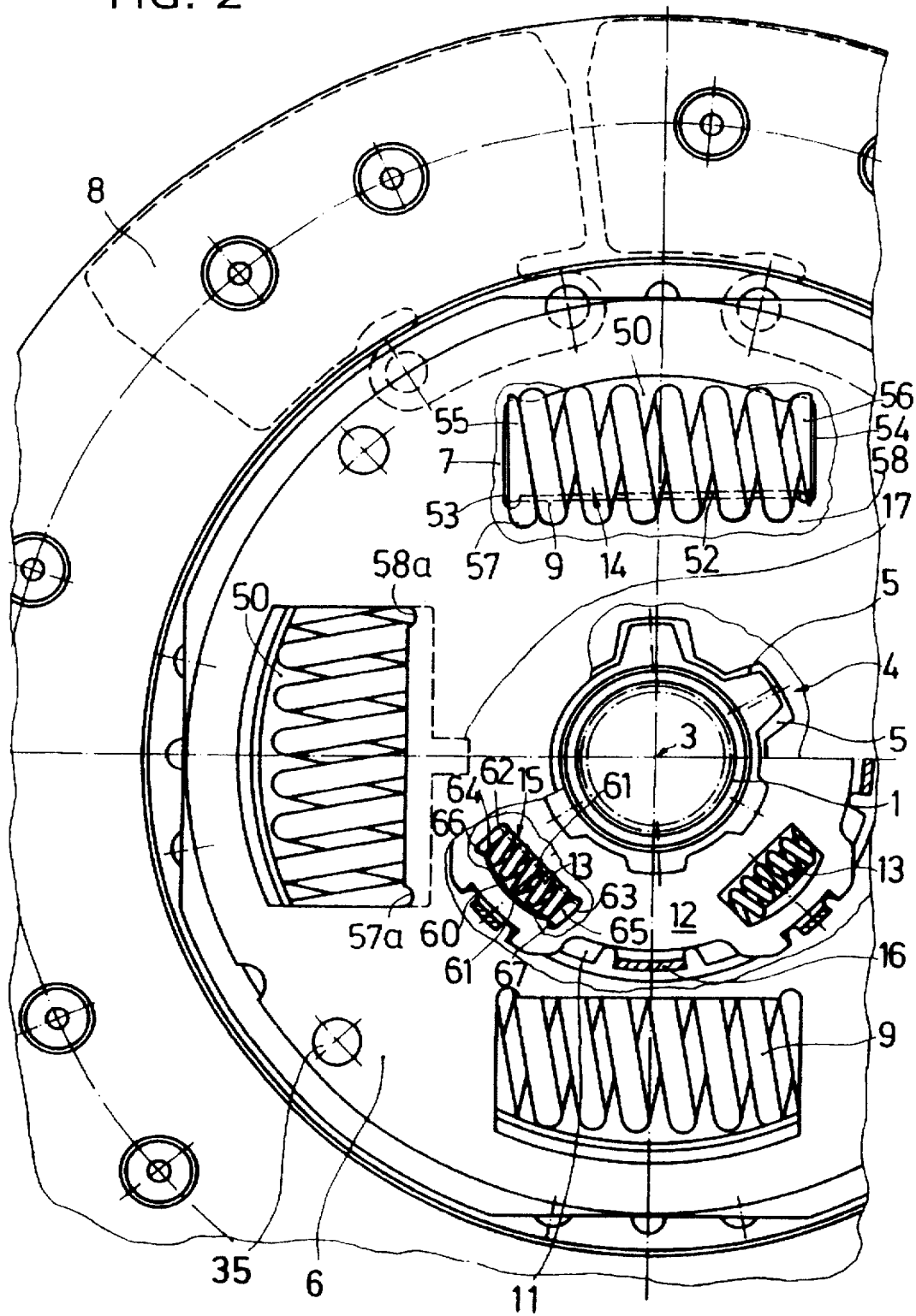
FIG. 2 shows a detail of a clutch plate with individual areas in cross section with predamper cover plates.

FIGS. 1 and 2 show the overall construction of a torsional damper such as used for a clutch plate of a friction clutch. In addition to the use of such a torsional damper for a clutch plate, such a torsional damper could also be adapted for use in a two-mass flywheel. Further details of a friction clutch are provided herebelow with reference to FIG. 4, while further details regarding a two-mass flywheel are provided herebelow with reference to FIG. 6.

A torsional damper can preferably be mounted, preferably in a non-rotational manner, but so that the damper can preferably still move axially, with a hub 1 on a transmission shaft (not shown). As such, the torsional damper can preferably rotate around the axis of rotation 3. The hub 1 can preferably be connected circumferentially to a hub disc 2 by means of a toothed portion 4 with torsional clearance 5 (as shown in FIG. 2). On both sides of the hub disc 2 there can be a cover plate 6 or 7. The cover plates 6 and 7 can preferably be non-rotationally connected to one another by means of connecting rivets 35 in the vicinity of their outside diameter.

Apertures 50 can preferably be provided in the cover plates 6 and 7, and apertures 51 can preferably be provided in the hub disc 2. Within these apertures there can preferably be coil springs 9, which coil springs 9 and apertures 50 and 51 essentially form a load spring device 14. The upper half of FIG. 2 depicts a cross section in the vicinity of one of the apertures 50. In essence, the depiction in FIG. 2 is a face view from the left-hand side of FIG. 1, with a cut-away in the vicinity of an aperture 50 to make it possible to see the configuration of an aperture 50 in the cover plate 7 from the side adjacent the hub disc 2. The aperture 50 on this side is designed with a depression 52 on its radially inner edge. In essence, in one possible embodiment of the present invention, this depression 52 can be formed by an axially outward bending (i.e., into the page of FIG. 2) of the metal of the radially inner edge.

The aperture 50 can also have edges 53 and 54, against which outermost windings 55 and 56 of the coil springs 9 can come into contact. These edges 53 and 54 can preferably be designed in the contact area of the windings 55 and 56, with respective indentations 57 and 58. The indentations 57, 58, can essentially be obtained, for example, by making a depression which is deeper than the depressions 52 on the radially inner edge. These indentations 57 and 58 can essentially form a pocket for the radial release of the corresponding winding 55, 56, thereby essentially providing a space adjacent the windings 55 and 56 for allowing radial movement of the windings 55 and 56 with respect to at least the cover plates 6 and 7. Thus, the indentations 57, 58 can preferably prevent a jamming of the final windings 55, 56 of the coil springs 9 in the apertures 50 even if the diameter of these windings 55, 56 is the same as the diameter of the other windings of the respective coil springs 9. In addition, by providing the windings 55, 56 with the same diameter as the other windings there is essentially minimized risk of the windings 55, 56 slipping away from the edges 53, 54 of the aperture 50.

The side of the cover plate 6 which faces the hub disc 2 can preferably be designed, in a manner not shown, just like the corresponding side of the cover plate 7, with the indentations 57, 58, so that the coil spring 9 can preferably be held on both sides in the advantageous manner described above.

Friction linings 8 can preferably be fastened on the outside circumference of one of the cover plates 6, 7, i.e., the cover plate 6 as shown. Both cover plates 6 and 7 can essentially be guided in rotation by means of the bearing ring 22, on the inside diameter of the cover plate 6, in the radial direction with respect to the hub 1.

Between the hub disc 2 and the cover plate 7, there can also preferably be a no-load spring device 15. This no-load spring device 15 can preferably be formed by two cover plates 10, 11, a hub disc 12 and coil springs 13. As such, the cover plates 10, 11 and hub disc 12 can define corresponding openings 60 therebetween for receipt of the coil springs 13 therein. In FIG. 2, for the left-hand aperture 60 of the no-load spring device 15, the cover plate 10 and the hub disc 12 have been removed to show the configuration of the aperture 60 on the inside of the cover plate 11, or side facing the hub disc 12.

Figure 3:
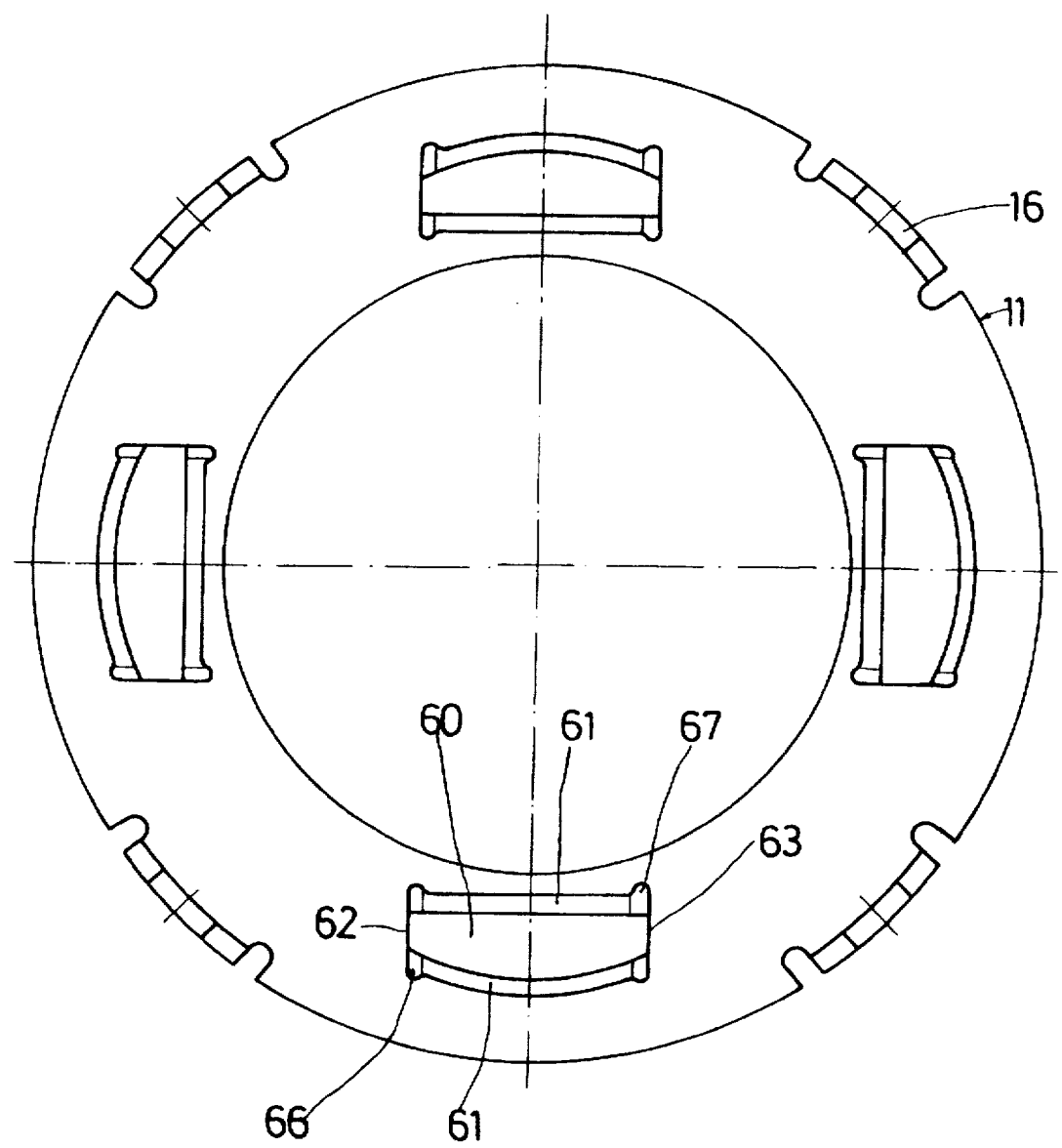
FIG. 3 shows an enlarged detail of a predamper cover plate.

As shown in FIGS. 2 and 3, the cover plate 11, on its radially inner edge and on its radially outer edge, can preferably have a depression 61, essentially the same as the depression 52 as discussed above. The aperture 60 of the cover plate 11 can also preferably be designed on its edges 62, 63, in the vicinity of the respective final windings 64, 65 of the coil springs 13, with indentations 66, 67. The indentations 66, 67, in essentially the same manner as the indentations 57, 58 as discussed above, can preferably form pockets for the radial release of the respective corresponding winding 64, 65 of the coil spring 13. Thus, the final windings 64, 65 of the coil spring 13 can essentially be free to move radially with respect to at least the cover plates 10 and 11.

These indentations 66, 67 can be formed, for example, by depressions which are deeper than the depressions 61 on the radial inner and outer edge of the cover plate 11. FIG. 3 shows an enlarged view of the cover plate 11 as an isolated part, to clearly illustrate the indentations 66, 67 on the apertures 60.

The cover plate 10, on its side facing the hub disc 12, can also preferably be designed like the corresponding side of the cover plate 11, so a further depiction of the cover plate 10 is not illustrated. The coil spring 13 is therefore held on both sides in the advantageous manner as described above.

The hub disc 12 can preferably be non-rotationally attached to the hub 1 and all the rotating components can be axially fixed with respect to the hub disc 12. As shown in FIG. 1, the outer cover plate 11, in the vicinity of its outside circumference and radially outside the coil spring 13, can preferably have axially-bent tabs 16 which can project into the notches 17 of the hub disc 2. These tabs 16 and notches 17 can thus create a rotational circumferential connection with no clearance. The same tabs 16 can preferably also serve to fix the circumference of the inner cover plate 10. Viewed in the axial direction, the cover plate 11 preferably lies on the cover plate 10 by means of support edges (not shown) on the cover plate 10, and both cover plates 10, 11 can be axially supported on the hub disc 2. The axial support force can preferably be generated by a spring plate 18 which can preferably be located between the cover plate 6 and a separate thrust collar 19, which thrust collar 19 can preferably be connected non-rotationally, but so that it can move axially, to the cover plate 6. As such, the thrust collar 19 can exert pressure on a friction ring 20 which, for its part, can also be supported on the hub disc 2. The axial force of the spring plate 18 can preferably be transmitted by means of the connecting rivets 35 to the cover plate 7, and from there by means of the friction ring 21 to the outer cover plate 11 of the no-load spring device 15. Therefore, viewed in the axial direction, this is a self-enclosed system.

Radial guidance of the rotating components can preferably be accomplished by means of a bearing ring 22, which bearing ring 22 can preferably be permanently inserted axially into the cover plate 6. The bearing ring 22 can preferably be pressurized by a sinuous, or zig-zag, spring 24, which spring 24 can be supported on the hub 1. The support force of the bearing ring 22 can be transmitted by means of the connecting rivets 35 to the opposite cover plate 7, whence it is returned via the spacer ring 23 to the hub 1. The hub 1, together with the sinuous spring 24, the bearing ring 22 and the spacer ring 23, thereby can essentially form a friction device with a low coefficient of friction, which friction, or friction device, can essentially be effective over the entire range of angular rotation, and only generates a friction force in the no-load range. In the load range, in addition to the no-load friction force, there can be an additional force which can be generated by the two friction rings 20 and 21 and by the spring plate 18.

In the embodiments depicted in FIGS. 1–3, the indentations 57, 58; 66, 67 are essentially depicted as having been manufactured by making a deeper depression. But the indentations 57, 58; 66, 67 can also be formed if, in the vicinity of the respective final windings of the coil springs 9, 13, there are recesses which are realized during the stamping of the apertures from the cover plates of the torsional damper during manufacture of the cover plates, thereby reducing manufacturing steps. Such recesses could essentially appear as recesses 57a and 58a in FIG. 2. The torsional damper with the indentations 57, 58; 66, 67 as described above, is described with reference to a conventional clutch plate. But, such a torsional damper could also preferably be used in connection with a dual-mass flywheel or as part of a lock-up clutch in torque converters. It is submitted that one of ordinary skill in the art would readily be able to adapt the conventions as provided by the present invention for use in a dual-mass flywheel, or lock-up clutch.

Examples of friction clutches and friction clutch discs which may be utilized in accordance with the embodiments of the present invention may be found in the following U.S. Pat. Nos. 3,861,764, which issued to Adams on Jan. 21, 1975, entitled "Bearing Assembly and Bearing Bushing Therefor"; 4,433,771, which issued to Caray on Feb. 28, 1984, entitled "Torsion Damping Device for a Clutch Plate"; 4,453,838, which issued to Loizeau on Jun. 12, 1984, entitled "Torsion Damping Assembly and Radially Deformable Bearing Therefor"; 4,635,780, which issued to Wiggen on Jan. 13, 1987, entitled "Clutch Disc for a Motor Vehicle Friction Clutch"; 4,684,007, which issued to Maucher on Aug. 4, 1987, entitled "Clutch Plate"; 4,697,682, which issued to Alas et al. on Oct. 6, 1987, entitled Torsional Damper Device"; 4,763,767, which issued to Lanzarini et al. on Aug. 16, 1988, entitled "Torsional Damper Devise"; and 4,890,712, which issued to Maucher et el. on Jan. 2, 1990, entitled "Torsional Vibration Damping Device for Clutch Plates".

Some examples of transmissions in which the present invention may be incorporated may be disclosed by the following U.S. Pat. Nos. 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

Some examples of two-mass flywheels and the components thereof which may incorporate the present invention therein may be disclosed by the following U.S. Pat. Nos. 5,103,688 to Kuhne, entitled "Two-Mass Flywheel"; 4,777,843 to Bopp, entitled "Two-Mass Flywheel Assembly With Viscous Damping Assembly".

One feature of the invention resides broadly in the torsional damper for a motor vehicle friction clutch, consisting of at least one hub concentric with an axis of rotation with hub disc and cover plates located on both sides of the hub disc, which cover plates are non-rotationally connected and held at a distance, coil springs which are located on one end in apertures in the hub disc and on the other end in apertures in the cover plates, and the outermost windings of which each come into contact with a corresponding edge of the apertures formed in the cover plates, characterized by the fact that those edges 53, 54; 62, 63 with which the outermost windings 55, 56; 64, 65 of the respective coil springs 9; 13 come in contact, are formed with indentations 57, 58; 66, 67 which hold the windings 55, 56; 64, 65 in a radially free position.

Another feature of the invention resides broadly in the torsional damper with apertures formed in the cover plates, which are provided with indentations in peripheral regions on their sides facing the coil springs, characterized by the fact that the indentations 57, 58; 66, 67 on the edges 53, 54; 62, 63 holding the outermost windings 55, 56; 64, 65 of the coil springs 9; 13 can be manufactured by a deeper depression than the other depressions 52; 61.

Yet another feature of the invention resides broadly in the torsional damper characterized by the fact that the indentations 57, 58; 66, 67 are formed by recesses.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 40 866.4, filed on Dec. 1, 1993, having inventors Norbert Ament and Harald Raab, and DE-OS P 43 40 866.4 and DE-PS P 43 40 866.4, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a friction clutch for a drive train of a motor vehicle, said clutch disc having an axis of rotation and defining an axial direction parallel to the axis of rotation, said clutch disc comprising:

hub means, said hub means comprising:

a hub portion for engaging shaft means of a transmission; and a hub disc disposed about said hub portion and extending radially from said hub portion, said hub disc having a first side and a second side facing away from one another;

at least one cover plate disposed adjacent said hub disc, said at least one cover plate being rotationally mounted on said hub portion for relative rotational movement with respect to said hub disc;

said at least one cover plate having an axial dimension;

means for damping relative rotational movement between said hub disc and said at least one cover plate;

said at least one cover plate comprising at least one opening therethrough at a position radially outward of said hub portion;

said at least one opening comprising a first edge portion and a second edge portion, said first and second edge portions being spaced apart from one another in a circumferential direction about the axis of rotation;

said first edge portion comprising a first indentation;

said damping means being disposed in said at least one opening, said damping means having a first end disposed adjacent said first edge portion of said at least one opening and a second end disposed adjacent said second edge portion of said at least one opening; said damping means comprising a first constant diameter, non-chamfered coil spring;

said first indentation comprising means for permitting substantially radial movement of said first end of said damping means within said at least one opening, said substantially radial movement being in a direction substantially radial with respect to the axis of rotation;

a portion of said first edge portion having an axial dimension; and the axial dimension of said portion of said first edge portion being substantially greater than the axial dimension of said at least one cover plate substantially adjacent said portion of said first edge portion.

2. The clutch disc according to claim 1, wherein:

said second edge portion comprises a second indentation;

said second indentation comprises means for permitting substantially radial movement of said second end of said damping means within said at least one opening, said substantially radial movement being in a direction substantially radial with respect to the axis of rotation;

a portion of said second edge portion has an axial dimension; and the axial dimension of said portion of said second edge portion is substantially greater than the axial dimension of said at least one cover plate substantially adjacent said portion of said second edge portion.

3. The clutch disc according to claim 2, wherein:

said at least one opening further comprises a third edge portion and a fourth edge portion disposed opposite one another;

said third edge portion being disposed a first radial distance with respect to the axis of rotation;

said fourth edge portion being disposed a second radial distance with respect to the axis of rotation;

said second radial distance corresponding to said fourth edge portion being greater than said first radial distance corresponding to said third edge portion, with respect to the axis of rotation;

said third edge portion comprises a first depression;

a portion of said first depression comprises an axial dimension; and the axial dimension of said portion of said first depression is substantially greater than the axial dimension of said at least one cover plate substantially adjacent said portion of said first depression.

4. The clutch disc according to claim 3 wherein:

said clutch disc defines a plane substantially perpendicular to the axis of rotation, said plane having a vertical axis and a horizontal axis intersecting one another, and being perpendicular to one another;

said at least one cover plate lies in said plane of said clutch disc;

said first indentation extending radially farther inward towards said horizontal axis than said first depression; and said second indentation extending radially farther inward towards said horizontal axis than said first depression.

5. The clutch disc according to claim 4 wherein:

said first end of said damping means comprises a first end turn of said first coil spring;

said second end of said damping means comprises a second end turn of said first coil spring;

said means for permitting substantially radial movement of said first end of said damping means comprises means for permitting substantially radial movement of said first end turn of said first coil spring;

said means for permitting substantially radial movement of said second end of said damping means comprises means for permitting substantially radial movement of said second end turn of said first coil spring;

said damping means further comprises a second coil spring;

said clutch disc further comprises at least one second cover plate;

said at least one second cover plate is disposed between said hub disc and said at least one cover plate;

said at least one second cover plate has an axial dimension;

said at least one second cover plate comprises at least one opening disposed radially farther inward toward the axis of rotation than said at least one opening of said at least one cover plate;

said at least one opening of said at least one second cover plate comprises a fifth edge portion and a sixth edge portion, said fifth and sixth edge portions being spaced apart from one another in a circumferential direction about the axis of rotation;

said fifth edge portion of said at least one second cover plate comprises a third indentation;

said sixth edge portion of said at least one second cover plate comprises a fourth indentation;

said second coil spring is disposed at least partially within said at least one opening of said at least one second cover plate;

said second coil spring has a first end turn disposed adjacent said fifth edge portion of said at least one opening of said at least one second cover plate;

said second coil spring has a second end turn disposed adjacent said sixth edge portion of said at least one opening of said at least one second cover plate;

said third indentation comprises means for permitting substantially radial movement of said first end turn of said second coil spring, said substantially radial movement being in a direction substantially radial with respect to the axis of rotation;

a portion of said fifth edge portion has an axial dimension;

the axial dimension of said portion of said fifth edge portion is substantially greater than the axial dimension of said at least one second cover plate substantially adjacent said portion of said fifth edge portion;

said fourth indentation comprises means for permitting substantially radial movement of said second end turn of said second coil spring, said substantially radial movement being in a direction substantially radial with respect to the axis of rotation;

a portion of said sixth edge portion has an axial dimension; and the axial dimension of said portion of said sixth edge portion is substantially greater than the axial dimension of said at least one second cover plate substantially adjacent said portion of said sixth edge portion.

6. The clutch disc according to claim 5, wherein:

said fifth edge portion of said at least one second cover plate comprises a fifth indentation;

said fifth indentation is disposed opposite said third indentation of said fifth edge portion;

said fifth indentation comprises second means for permitting substantially radial movement of said first end turn of said second coil spring, said substantially radial movement being in a direction substantially radial with respect to the axis of rotation;

a portion of said fifth indentation has an axial dimension;

the axial dimension of said portion of said fifth indentation is substantially greater than the axial dimension of said at least one second cover plate substantially adjacent said portion of said fifth indentation;

said sixth edge portion of said at least one second cover plate comprises a sixth indentation;

said sixth indentation is disposed opposite said fourth indentation of said sixth edge portion;

said sixth indentation comprises second means for permitting substantially radial movement of said second end turn of said second coil spring, said substantially radial movement being in a direction substantially radial with respect to the axis of rotation;

a portion of said sixth indentation has an axial dimension; and the axial dimension of said portion of said sixth indentation is substantially greater than the axial dimension of said at least one second cover plate substantially adjacent said portion of said sixth indentation.

7. The clutch disc according to claim 6, wherein:

said at least one second cover plate lies in the plane of said clutch disc;

said at least one opening of said at least one second cover plate comprises a seventh edge portion and an eighth edge portion;

said seventh edge portion is disposed a third radial distance with respect to the axis of rotation;

said eighth edge portion is disposed a fourth radial distance with respect to the axis of rotation;

said fourth radial distance corresponding to said eighth edge portion is greater than said third radial distance corresponding to said seventh edge portion with respect to the axis of rotation;

said seventh edge portion comprises a second depression;

a portion of said second depression has an axial dimension;

the axial dimension of said portion of said second depression is substantially greater than the axial dimension of said at least one second cover plate substantially adjacent said portion of said second depression;

said eighth edge portion comprises a third depression;

a portion of said third depression has an axial dimension;

the axial dimension of said portion of said third depression is substantially greater than the axial dimension of said at least one second cover plate substantially adjacent said portion of said third depression;

each of said third and fourth indentations is disposed adjacent said seventh edge portion;

each of said third and fourth indentations extend radially farther inward towards said horizontal axis of said clutch disc than said second depression;

each of said fifth and sixth indentations is disposed adjacent said eighth edge portion; and each of said fifth and sixth indentations extend radially farther away from said horizontal axis of said clutch disc than said third depression.

8. The clutch disc according to claim 7, wherein:

said at least one cover plate comprises two cover plates disposed opposite one another;

said two cover plates are a first cover plate and a third cover plate;

said first cover plate comprises said at least one opening of said at least one cover plate;

said third cover plate comprises at least one opening;

said at least one opening of said third cover plate is substantially identical to said at least one opening of said first cover plate;

said first cover plate is disposed at said first side of said hub disc;

said second cover plate is disposed at said second side of said hub disc;

said hub disc comprises at least one opening therethrough at a position radially outward of said hub portion;

said at least one opening of said hub disc is in alignment with said at least one opening of said first cover plate and said at least one opening of said third cover plate to form a first window; and said first coil spring is disposed in said first window;

said at least one second cover plate comprises two cover plates disposed opposite one another;

said two cover plates of said at least one second cover plate are a second cover plate and a fourth cover plate;

said second cover plate comprises said at least one opening of said at least one second cover plate;

said fourth cover plate comprises at least one opening;

said at least one opening of said fourth cover plate is substantially identical to said at least one opening of said second cover plate;

each of said second cover plate and said fourth cover plate is disposed between said hub disc and one of said first cover plate and said third cover plate;

said hub disc is a first hub disc;

said clutch disc further comprises a second hub disc;

said second hub disc is disposed between said second cover plate and said fourth cover plate;

said second hub disc comprises at least one opening therethrough at a position radially outward of said hub portion;

said at least one opening of said second hub disc is disposed radially further inward towards the axis of rotation than said at least one opening of said first hub disc;

said at least one opening of said second hub disc is in alignment with said at least one opening of said second cover plate and said at least one opening of said fourth cover plate to form a second window; and said second coil spring is disposed in said second window.

9. A method of producing a clutch disc of a friction clutch for a drive train of a motor vehicle, said clutch disc defining an axis of rotation and an axial direction parallel to the axis of rotation, said clutch disc comprising: hub means, said hub means comprising: a hub portion for engaging shaft means of a transmission; and a hub disc disposed about said hub portion and extending radially from said hub portion, said hub disc having a first side and a second side facing away from one another; at least one cover plate disposed adjacent said hub disc, said at least one cover plate being rotationally mounted on said hub portion for relative rotational movement with respect to said hub disc; means for damping relative rotational movement between said hub disc and said at least one cover plate, said at least one cover plate having an axial dimension; said at least one cover plate comprising at least one opening therethrough at a position radially outward of said hub portion; said at least one opening comprising a first edge portion and a second edge portion, said first and second edge portions being spaced apart from one another in a circumferential direction about the axis of rotation; the first edge portion comprising a first indentation; a portion of said first edge portion having an axial dimension, the axial dimension of said portion of said first edge portion being substantially greater than the axial dimension of said at least one cover plate substantially adjacent said portion of said first edge portion; said damping means being disposed in said at least one opening, said damping means having a first end disposed adjacent said first edge portion of said at least one opening and a second end disposed adjacent said second edge portion of said at least one opening; and said first indentation comprising means for permitting substantially radial movement of said first end of said damping means within said at least one opening, said substantially radial movement being in a direction substantially radial with respect to the axis of rotation, said method comprising the steps of:

providing hub means, said step of providing said hub means further comprising:
 providing a hub portion for engaging shaft means of a transmission; and
 providing a hub disc, said hub disc having a first side and a second side facing away from one another;
 providing at least one cover plate disposed adjacent said hub disc;

providing means for damping relative rotational movement between said hub disc and said at least one cover plate, said means for damping having a first end and a second end;

said method further comprising the steps of:
disposing said hub disc about said hub portion;
extending said hub disc radially from said hub portion;
disposing said at least one cover plate adjacent said hub disc and rotationally mounting said at least one cover plate on said hub portion for relative rotational movement with respect to said hub disc;
forming at least one opening in said at least one cover plate at a position radially outward of said hub portion;
configuring said at least one opening to have a first edge portion and a second edge portion;
disposing said first and second edge portions in a spaced apart manner from one another in a circumferential direction about the axis of rotation;
forming a first indentation in said first edge portion;
configuring said first indentation to permit substantially radial movement of said first end of said damping means within said at least one opening;
configuring a portion of said first edge portion to have an axial dimension substantially greater than the axial dimension of said at least one cover plate substantially adjacent said portion of said first edge portion;
disposing said damping means in said at least one opening;
disposing said first end of said damping means adjacent said first edge portion of said at least one opening and disposing said second end of said damping means adjacent said second edge portion of said at least one opening; and
permitting substantially radial movement of said first end of said damping means within said at least one opening, said substantially radial movement being in a direction substantially radial with respect to the axis of rotation.

10. The method according to claim 9, said method further comprising the steps of:
forming a second indentation in said second edge portion;
configuring said second indentation to permit substantially radial movement of said second end of said damping means within said at least one opening; and
configuring a portion of said second edge portion to have an axial dimension substantially greater than the axial dimension of said at least one cover plate substantially adjacent said portion of said second edge portion.

11. The method according to claim 10, said method further comprises:
configuring said at least one opening to further comprise a third edge portion and a fourth edge portion disposed opposite one another;
disposing said third edge portion at a first radial distance with respect to the axis of rotation;
disposing said fourth edge portion at a second radial distance with respect to the axis of rotation;
said second radial distance corresponding to said fourth edge portion being greater than said first radial distance corresponding to said third edge portion, with respect to the axis of rotation;
forming a first depression in said third edge portion; and
configuring a portion of said first depression to have an axial dimension substantially greater than the axial dimension of said at least one cover plate substantially adjacent said portion of said first depression.

12. The method according to claim 11 wherein:
said clutch disc defines a plane substantially perpendicular to the axis of rotation, said plane having a vertical axis and a horizontal axis intersecting one another, and being perpendicular to one another;
said at least one cover plate lies in said plane of said clutch disc;
said method further comprising the steps of:
 extending said first indentation radially farther inward towards said horizontal axis than said first depression; and
 extending said second indentation radially farther inward towards said horizontal axis than said first depression.

13. The method according to claim 12, wherein said method further comprises:
configuring said first end of said damping means to comprise a first end turn of said first coil spring;
configuring said second end of said damping means to comprise a second end turn of said first coil spring;
configuring said first indentation to permit substantially radial movement of said first end turn of said first coil spring;
configuring said second indentation to permit substantially radial movement of said second end turn of said first coil spring;
configuring said damping means to further comprise a second coil spring;
configuring said clutch disc to further comprise at least one second cover plate;
providing said at least one second cover plate;
said at least one second cover plate has an axial dimension;
disposing said at least one cover plate between said hub disc and said at least one cover plate;

forming at least one opening in said at least one second cover plate;

disposing said at least one opening in said at least one second cover plate radially farther inward toward the axis of rotation than said at least one opening of said at least one cover plate;

configuring said at least one opening of said at least one cover plate to have a fifth edge portion and a sixth edge portion;

disposing said fifth and sixth edge portions spaced apart from one another in a circumferential direction about the axis of rotation;

disposing said second coil spring at least partially within said at least one opening of said at least one second cover plate;

disposing said second coil spring to have a first coil turn of said second coil spring adjacent to said fifth edge portion;

disposing said second coil spring to have a second coil turn of said second coil spring adjacent to said sixth edge portion;

forming a third indentation in said fifth edge portion;

configuring said third indentation to permit substantially radial movement of said first end turn of said second coil spring, said substantially radial movement being in a direction substantially radial with respect to the axis of rotation;

configuring a portion of said third edge portion to have an axial dimension substantially greater than the axial dimension of said at least one second cover plate substantially adjacent said portion of said third edge portion;

forming a fourth indentation in said sixth edge portion;

configuring said fourth indentation to permit substantially radial movement of said second end turn of said second coil spring, said substantially radial movement being in a direction substantially radial with respect to the axis of rotation; and configuring a portion of said fourth edge portion to have an axial dimension substantially greater than the axial dimension of said at least one second cover plate substantially adjacent said portion of said fourth edge portion.

14. The method according to claim 13, wherein said method further comprises:

forming a fifth indentation in said fifth edge portion;

disposing said fifth indentation opposite said third indentation of said fifth edge portion;

configuring said fifth indentation to permit substantially radial movement of said first end turn of said second coil spring, said substantially radial movement being in a direction substantially radial with respect to the axis of rotation;

configuring a portion of said fifth indentation to have an axial dimension substantially greater than the axial dimension of said at least one second cover plate substantially adjacent said portion of said fifth indentation;

forming a sixth indentation in said sixth edge portion;

disposing said sixth indentation opposite said fourth indentation of said sixth edge portion;

configuring said sixth indentation to permit substantially radial movement of said second end turn of said second coil spring, said substantially radial movement being in a direction substantially radial with respect to the axis of rotation; and configuring a portion of said sixth indentation to have an axial dimension substantially greater than the axial dimension of said at least one second cover plate substantially adjacent said portion of said sixth indentation.

15. The method according to claim 14, wherein said method further comprises:

disposing said at least one second cover plate in the plane of said clutch disc;

configuring said at least one opening of said at least one second cover plate to have a seventh edge portion and an eighth edge portion;

disposing said seventh edge portion a third radial distance with respect to the axis of rotation;

disposing said eighth edge portion a fourth radial distance with respect to the axis of rotation;

said fourth radial distance corresponding to said eighth edge portion is greater than said third radial distance corresponding to said seventh edge portion with respect to the axis of rotation;

forming a second depression on said seventh edge portion;

configuring a portion of said second depression to have an axial dimension substantially greater than the axial dimension of said at least one second cover plate substantially adjacent said portion of said second depression;

forming a third depression on said eighth edge portion;

configuring a portion of said third depression to have an axial dimension substantially greater than the axial dimension of said at least one second cover plate substantially adjacent said portion of said third depression;

disposing said third indentation adjacent said seventh edge portion;

disposing said fourth indentation adjacent said seventh edge portion;

extending said third indentation radially farther inwards towards said horizontal axis of said clutch disc than said second depression;

extending said fourth indentation radially farther inwards towards said horizontal axis of said clutch disc than said second depression;

disposing said fifth indentation adjacent said eighth edge portion;

disposing said sixth indentation adjacent said eighth edge portion;

extending said fifth indentation radially farther away from said horizontal axis of said clutch disc than said third depression; and extending said sixth indention radially farther away from said horizontal axis of said clutch disc than said third depression.

16. The method according to claim 15, wherein said method further comprises:

said step of providing at least one cover plate further comprises providing two cover plates disposed opposite one another, said two cover plates being a first cover plate and a third cover plate;

configuring said first cover plate to comprise said at least one opening of said at least one cover plate;

forming at least one opening in said third cover plate;

configuring said at least one opening in said third cover plate to be substantially identical to said at least one opening of said first cover plate;

disposing said first cover plate at said first side of said hub disc;

disposing said second cover plate at said second side of said hub disc;

forming at least one opening in said hub disc; aligning said at least one opening of said hub disc with said at least one opening of said first cover plate and said at least one opening of said third cover plate to form a first window;

disposing said first coil spring in said first window;

said step of providing at least one second cover plate further comprises providing two cover plates disposed opposite one another, said two cover plates being a second cover plate and a fourth cover plate;

configuring said second cover plate to comprise said at least one opening of said at least one second cover plate;

forming at least one opening in said fourth cover plate;

configuring said at least one opening in said fourth cover plate to be substantially identical to said at least one opening of said second cover plate;

disposing said second cover plate between said hub disc and one of said first cover plate and said third cover plate;

disposing said fourth cover plate between said hub disc and the one of said first cover plate and said third cover plate;

said clutch disc further comprises a second hub disc;

providing said second hub disc;

disposing said second hub disc between said second cover plate and said fourth cover plate;

forming at least one opening in said second hub disc;

aligning said at least one opening of said second hub disc with said at least one opening of said second cover plate and said at least one opening of said fourth cover plate to form a second window; and disposing said second coil spring in said second window.

17. A cover plate for a hub disc of a friction clutch for a motor vehicle, said cover plate having an axis of rotation, said cover plate comprising:

means for accommodating a damping device of the hub disc;

said damping device comprising constant diameter, non-chamfered coil spring;

said means for accommodating a damping device comprising:

at least one opening;

said at least one opening extending through said cover plate;

said at least one opening comprising a first edge portion and a second edge portion; and said first edge portion being spaced apart from said second edge portion in a circumferential direction about the axis of rotation;

said first edge portion comprising a first indentation;

said first indentation comprising means for permitting substantially radial movement of an end of said damping device; and a portion of said first edge portion having an axial dimension;

said cover plate having an axial dimension; and the axial dimension of said portion of said first edge portion being substantially greater than the axial dimension of said cover plate substantially adjacent said portion of said first edge portion.

18. The cover plate according to claim 17, wherein:

said second edge portion comprises a second indentation;

said second indentation comprises means for permitting substantially radial movement of an opposite end of said damping means within said at least one opening, said substantially radial movement being in a direction substantially radial with respect to the axis of rotation;

a portion of said second edge portion has an axial dimension; and the axial dimension of said portion of said second edge portion is substantially greater than the axial dimension of said cover plate substantially adjacent said portion of said second edge portion.

19. The cover plate according to claim 18, wherein:

said at least one opening comprises a third edge portion and a fourth edge portion disposed opposite one another;

said third edge portion is disposed a first radial distance with respect to the axis of rotation;

said fourth edge portion is disposed a second radial distance with respect to the axis of rotation;

said second radial distance corresponding to said fourth edge portion is greater than said first radial distance corresponding to said third edge portion, with respect to the axis of rotation;

said third edge portion comprises a first depression;

a portion of said first depression has an axial dimension;

the axial dimension of said portion of said first depression is substantially greater than the axial dimension of said cover plate substantially adjacent said portion of said first depression;

said cover plate defines a plane substantially perpendicular to the axis of rotation, said plane having a vertical axis and a horizontal axis intersecting one another, and being perpendicular to one another;

said first indentation of said first edge portion extends radially farther inward towards said horizontal axis than said first depression; and said second indentation of said second edge portion extends radially farther inward towards said horizontal axis than said first depression of said third edge portion.

20. The cover plate according to claim 19, wherein:

said first edge portion comprises a third indentation;

said third indentation is disposed opposite said first indentation;

said third indentation comprises second means for permitting substantially radial movement of an end of a damping device;

a portion of said third indentation has an axial dimension;

the axial dimension of said portion of said third indentation is substantially greater than the axial dimension of said cover plate substantially adjacent said portion of said third indentation;

said second edge portion comprises a fourth indentation;

said fourth indentation is disposed opposite said second indentation;

said fourth indentation comprises second means for permitting substantially radial movement of an opposite end of a damping device;

a portion of said fourth indentation has an axial dimension;

the axial dimension of said portion of said fourth indentation is substantially greater than the axial dimension of said cover plate substantially adjacent said portion of said fourth indentation;

said fourth edge portion comprises a second depression;

a portion of said second depression has an axial dimension;

the axial dimension of said portion of said second depression is substantially greater than the axial dimension of said cover plate substantially adjacent said portion of said second depression;

said third indentation of said first edge portion extends radially farther outward from said horizontal axis than said second depression; and said fourth indentation of said second edge portion extends radially farther outward from said horizontal axis than said second depression.

* * * * *

UNITED STATES PATENT AND TRADEMARK OFFICE
CERTIFICATE OF CORRECTION

PATENT NO. : 5,687,828
DATED : November 18, 1997
INVENTOR(S) : Norbert AMENT and Harald RAAB It is certified that error appears in the above-identified patent and that said Letters Patent is hereby corrected as shown below:

In column 2, line 46, after the first occurrence of 'the', delete "came" and insert --same--.

In column 7, line 32, after 'Damper', delete " Devise"; " and insert --Device";--.

Signed and Sealed this

Twenty-fourth Day of March, 1998

Attest:

BRUCE LEHMAN

Attesting Officer

Commissioner of Patents and Trademarks